United States Patent [19]

Hollenbeck

[11] 3,856,318

[45] Dec. 24, 1974

[54] ARTICULATED MULTIPLE SECTION SNOWMOBILE SKI

[76] Inventor: Perry T. Hollenbeck, 706 Michigan Ave., Manistique, Mich. 49854

[22] Filed: Oct. 11, 1973

[21] Appl. No.: 405,579

[52] U.S. Cl. .................................. 280/28, 180/5 R
[51] Int. Cl. .......................................... B62b 19/04
[58] Field of Search .................. 280/28, 22, 16, 21; 180/5 R

[56] References Cited
UNITED STATES PATENTS
3,526,412  9/1970  Garcia ................................ 280/16
3,560,012  2/1971  Auer .................................... 280/16

*Primary Examiner*—Robert R. Song
*Attorney, Agent, or Firm*—Clarence A. O'Brien; Harvey B. Jacobson

[57] ABSTRACT

An elongated ski assembly including front and rear ends and defined by a plurality of elongated end aligned ski sections with each pair of adjacent sections pivotally joined together for relative angular displacement about a horizontal transverse axis and also about an upstanding axis. The rearmost section is mounted from a stationary snowmobile mounted support by a generally horizontal trailing leaf spring and the front section is supported from one end of a second leaf spring having its other end mounted from the support for angular displacement about an upstanding axis.

10 Claims, 5 Drawing Figures

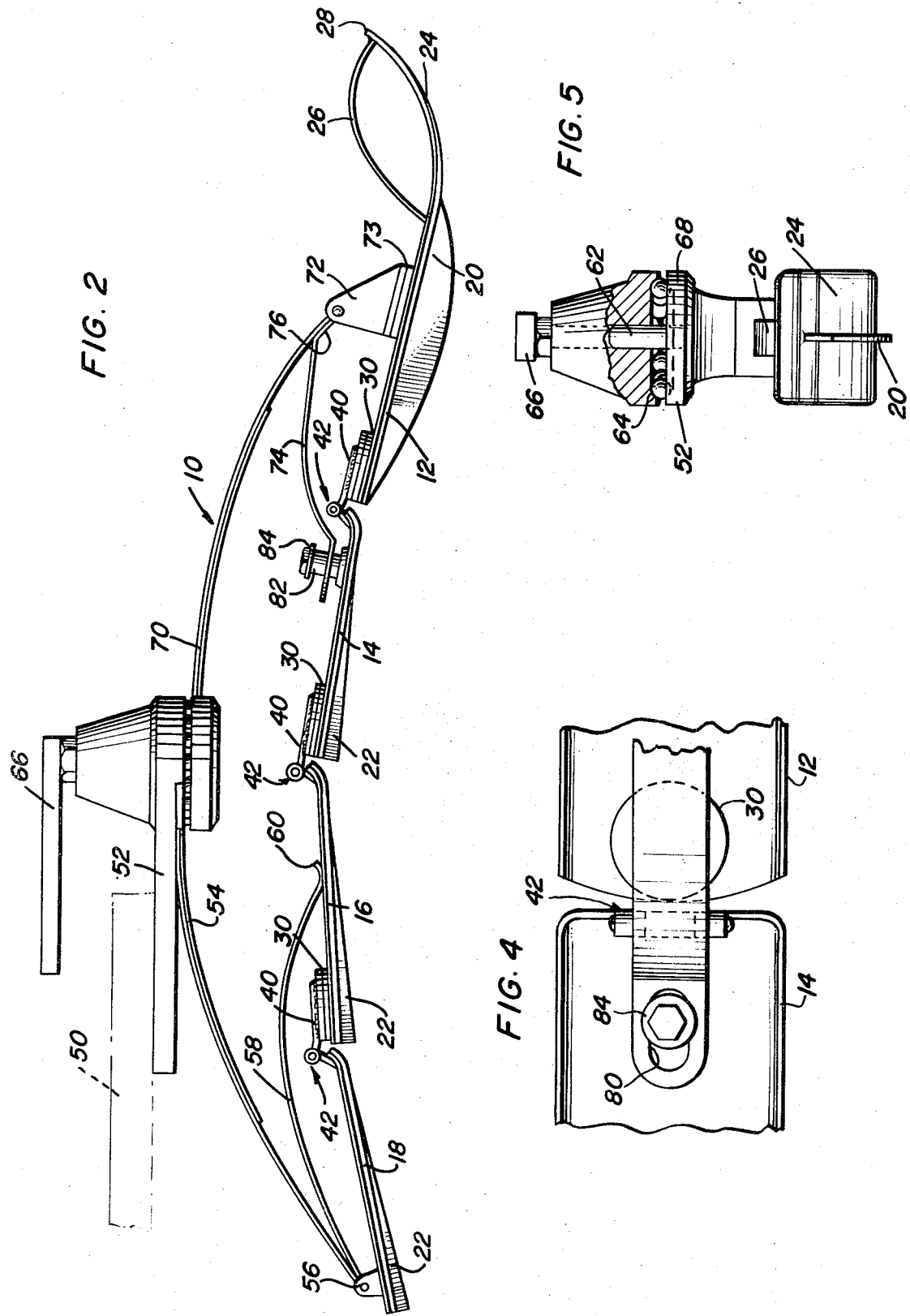

3,856,318

ARTICULATED MULTIPLE SECTION SNOWMOBILE SKI

The snowmobile ski assembly of the instant invention consists of four segments connected by horizontal and vertical pivots. The rear section is supported from the free end of a stationary snowmobile mounted leaf spring and the front section is supported from one end of a leaf spring whose other end is supported from the associated snowmobile for angular displacement about an upstanding axis spaced approximately mid-way between the opposite ends of the ski assembly.

Conventionally, the front skis of a snowmobile are flexible only to a slight extent for bending about a horizontal axis and the entire front skis are steered in the manner of the front wheels of an automobile in order to enable the snowmobile to execute turns.

While conventional steerable snowmobile skis are capable of causing a snowmobile to execute turns, there is necessarily side slippage between the snow covered surface and the front and rear ends of a conventional snowmobile ski when a turn is being executed and this inherent side slippage decreases the traction of conventional snowmobile skis on snow covered surfaces.

The ski assembly of the instant invention comprises an articulated ski construction constructed in a manner whereby the various longitudinally spaced end aligned ski sections thereof may be supported in a horizontal arcuate path conforming to the desired turn and thus greatly reducing the inherent side slippage of the ski assembly in order to afford greater turning traction.

Also, the ski assembly of the instant invention is constructed in a manner whereby the end aligned ski sections may be arced in a vertical plane as well as a horizontal plane and the ski assembly of the instant invention therefore affords greater traction when a snowmobile is moving over rough terrain.

The main object of this invention is to provide a snowmobile ski assembly which will afford considerably greater turning traction.

Another object of this invention is to provide a snowmobile ski assembly of the articulated type and which will conform to rough terrain over which the ski assembly may be moving.

Still another object of this invention is to provide a snowmobile ski assembly which will inherently be capable of absorbing greater vertical shock loads without transmitting such shock loads to the associated snowmobile.

A final object of this invention to be specifically enumerated herein is to provide a snowmobile ski assembly in accordance with the preceding objects which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings, forming a part hereof, wherein like numerals refer to like parts throughout.

FIG. 2 is a side elevational view of the assemblage illustrated in FIG. 1 and with the spring mounting structure of the ski assembly operatively supported from a stationary snowmobile mounted support;

Figure 1:
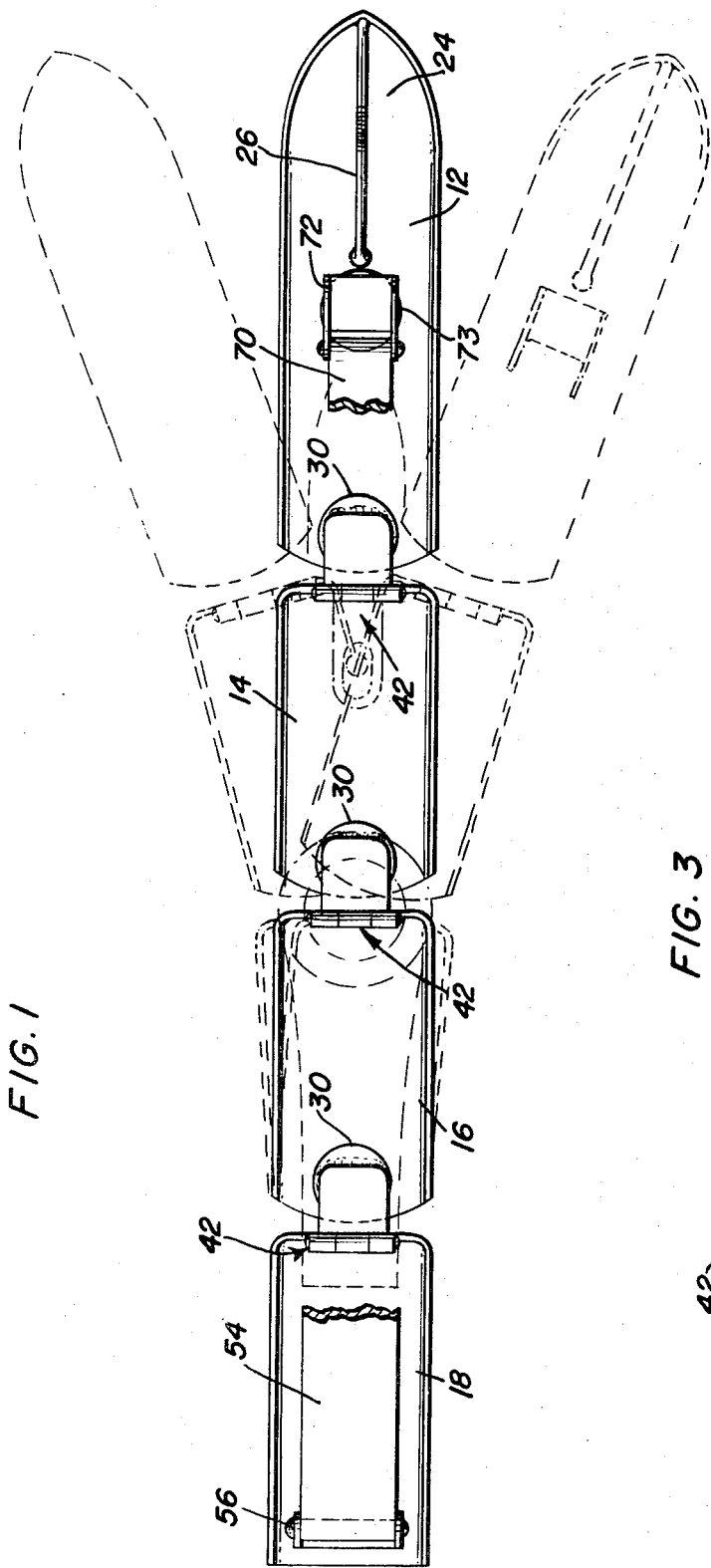
FIG. 1 is a top plan view of the snowmobile ski assembly of the instant invention with portions of the supporting structure therefor being broken away and illustrated in horizontal section and alternate articulated positions of the ski assembly illustrated in phantom line.

FIG. 4 is a fragmentary enlarged top plan view of the articulated connection between the forwardmost ski section and the ski section disposed immediately rearward of the forwardmost ski section; and FIG. 5 is a front elevational view of the assemblage illustrated in FIG. 2 and with portions of the pivot mount for the rear end of the front leaf spring being broken away and illustrated in transverse vertical section.

Referring now more specifically to the drawings, the numeral 10 generally designates the ski assembly of the instant invention. The assembly 10 includes four longitudinally spaced ski sections 12, 14, 16 and 18. Each section 12, 14, 16 and 18 is constructed of metal and includes forward and opposite side marginal edge portions which are turned upwardly. In addition, the forward section 12 includes a depending major fin 20 which extends along its undersurface and the sections 14, 16 and 18 each include secondary depending longitudinal fins 22.

The forward end of the front section 12 curves upwardly as at 24 and is braced at its tip end by means of a bowed bracing member 26 extending longitudinally of the section 12 and having its forward end secured to the tip 28 of the section 12 and its rear end connected to the section 12 immediately rearward of the upwardly curving tip of the section 12.

The rear end of each section 12, 14 and 16 has a combined thrust and journal bearing 30 secured thereto in any convenient manner such as by welding and the bearing 30 has a bore 32 formed therethrough provided with a diametrically enlarged counterbore 34 at its lower end. The lower end of the counterbore 34 of each bearing 30 is closed by the ski section to which it is secured and a flanged pivot shaft 36 is secured through an opening 38 formed in a hinge leaf 40 of a hinge assembly referred to in general by the reference numeral 42 and including a second hinge leaf 44 secured as by welding to the forward end of the next rear ski section. The lower flanged end of the pivot shaft 36 is rotatably and captively received within the counterbore 34 and the pivot shaft 36 is journaled in the bore 32. In addition, a reinforcing washer 46 is welded to the hinge leaf 40 and the pivot shaft 36 below the hinge leaf 40 and defines a thrust bearing for bearing contact with the opposing upper surface of the bearing 30.

Figure 3:
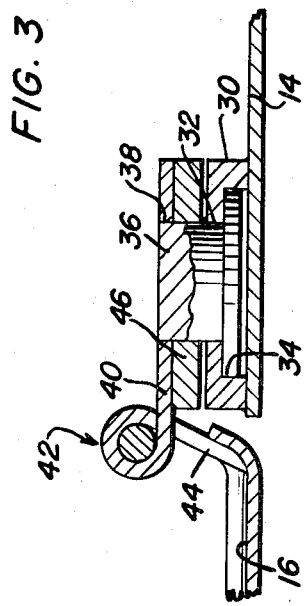
FIG. 3 is an enlarged fragmentary longitudinal vertical sectional view illustrating the articulated connection between a pair of adjacent ski sections.

The ski sections 12 and 14 are articulatively connected by the structure illustrated in FIG. 3 as are the sections 14 and 16 and the sections 16 and 18.

A corresponding snowmobile is referred to in general by the reference numeral 50 and includes a stationary support 52. The forward end of a longitudinal leaf spring 54 is anchored to the support 52 and the rear end of the leaf spring 54 is pivotally anchored to the rear end of the ski section 18 by means of a pivot bracket 56. In addition, the rear end of a secondary leaf spring 58 (integral with the rear end of the spring 54) is pivoted to the pivot bracket and the forward end of the secondary leaf spring is rolled upwardly as at 60 and is biased downwardly on the mid-portion of the next to the rear ski section 16.

A steering shaft 62 disposed in upstanding position is journaled through the support 52 by means of a combined thrust and journal bearing structure 64 and a steering arm 66 is carried by the upper end of the steering shaft 62. The lower end of the steering shaft 62 includes a head portion 68 to which the rear end of a forwardly projecting leaf spring 70 is fixedly secured. The forward end of the leaf spring 70 is pivotally anchored to the mid-portion of the ski section 12 by means of the pivot bracket 72 pivotally mounted (by means of a combined thrust and journal bearing 73 similar to bearings 30) and projecting upwardly from the central area of the ski section 12 and a forward secondary spring 74 has a forward angulated end portion 76 underlying the adjacent portions of the leaf spring 70 in surface to surface contacting relation therewith and is also pivotally anchored to the pivot bracket 72. The rear end of the forward secondary leaf spring 74 is provided with a longitudinal slot 80 upwardly through which a bearing post 82 carried by the forward portion of the section 14 projects. The post 82 is slidable longitudinally of the slot 80 and through the latter and includes an upper end abutment 84 preventing upward displacement of the rear slotted end of the forward secondary leaf spring 74 from the post 82.

In operation, it will of course be understood that the steering arm 66 will have the conventional steering mechanism of the snowmobile 50 connected thereto. From FIG. 2 of the drawings it may be seen that the ski assembly 10 may be readily arched in a vertical plane in order to conform to irregular ground surfaces over which the ski assembly 10 may be moving. Further, from FIG. 1 of the drawings it may be appreciated that upon oscillation of the steering arm 66 the forward end of the leaf spring 70 will swing from side to side thus carrying the forwardmost ski section 12 therewith and angularly displacing the ski section 12. From a careful study of FIGS. 1 and 2 of the drawings it may be seen that the rear end of the forward secondary spring 74 will also be swung in a horizontal arc during oscillation of the steering arm 66 and the forward ski section 12. Of course, the swinging of the section 14 is not as great as the swinging of the forward section 12 in view of the shorter effective length of the support arm (the springs 70 and 74) of the section 14. In any event, as the steering arm 66 is oscillated to swing the forward section 12 from side to side in the manner illustrated in phantom lines in FIG. 1 of the drawings the sections 14, 16 and 18 will be disposed along a substantially constant radius arc passing through the longitudinal and transverse mid-portions of the sections 12, 14, 16 and 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated ski assembly including front and rear ends and defined by at least three elongated and end aligned ski sections having adjacent ends pivotally joined together for relative angular displacement about horizontal transverse and upstanding axes, a support member, spring means supporting said sections from said support member for vertical shifting relative thereto and including steering means connected to at least the forwardmost section for swinging the latter about an upstanding axis disposed rearward of said forward section relative to said support, said spring means, including said steering means, also supporting at least the forward end of the ski section immediately behind said forwardmost section for lateral swinging with the rear end of said forwardmost section during actuation of said steering means to swing said forwardmost section about said upstanding axis and thus allow relative angular displacement of said sections with the latter maintained in adjacent end aligned train fashion position relative to each other.

2. The combination of claim 1 wherein said spring means includes elongated arm means projecting forward from said upstanding axis, the forward end portion of said arm means being attached to the forwardmost section, an intermediate portion of said arm means, rearward of its forward end portion, being attached to the section disposed immediately behind said forwardmost section, the rear end portion of said arm means being supported from said support for oscillation about said upstanding axis.

3. The combination of claim 2 wherein said intermediate portion of said arm means is attached to the section disposed immediately behind said forwardmost section by means of a pivot connection affording angular displacement of said section immediately behind the forwardmost section relative to said arm means about a second upstanding axis.

4. The combination of claim 2 wherein said arm means comprises an elongated spring arm structure.

5. The combination of claim 1 wherein said spring means includes an elongated spring arm attached at one forward end to said support and extending rearwardly from the latter, the rear end of said spring arm being attached to the rearmost section.

6. The combination of claim 5 wherein said rear end of said spring arm is pivotally attached to said rearmost section for relative oscillation of said rear end and said rearmost section about a horizontal transverse axis.

7. The combination of claim 6 wherein said spring means includes elongated arm means projecting forward from said upstanding axis, the forward end portion of said arm means being attached to the forwardmost section, at an intermediate portion of said arm means, rearward of its forward end portion, being attached to the section disposed immediately behind said forwardmost section, the rear end portion of said arm means being supported from said support for oscillation about said upstanding axis.

8. The combination of claim 7 wherein said intermediate portion of said arm means is attached to the section disposed immediately behind said forwardmost section by means of a pivot connection affording angular displacement of said section immediately behind the forwardmost section relative to said arm means about a second upstanding axis.

9. The combination of claim 8 wherein said arm means comprises an elongated spring arm structure.

10. The combination of claim 1 wherein said assembly includes four end aligned sections.

* * * * *